United States Patent [19]

Senta

[11] Patent Number: 5,095,426
[45] Date of Patent: Mar. 10, 1992

[54] DATA PROCESSING SYSTEM FOR EFFECTIVELY HANDLING EXCEPTIONS DURING EXECUTION OF TWO DIFFERENT TYPES OF INSTRUCTIONS

[75] Inventor: Tetsuhide Senta, Tokyo, Japan

[73] Assignee: NEC Corporation, Tokyo, Japan

[21] Appl. No.: 361,977

[22] Filed: Jun. 6, 1989

[30] Foreign Application Priority Data

Jun. 8, 1988 [JP] Japan ............................ 63-140779

[51] Int. Cl.⁵ .............................................. G06F 9/22
[52] U.S. Cl. ................................ 395/375; 364/262.8; 364/262.4; 364/265.6; 364/261.3; 364/DIG. 1
[58] Field of Search ... 364/200 MS File, 900 MS File

[56] References Cited

U.S. PATENT DOCUMENTS

| | | | |
|---|---|---|---|
| 3,766,532 | 10/1973 | Liebel | 364/200 |
| 3,886,523 | 5/1975 | Ferguson | 364/200 |
| 4,370,709 | 1/1983 | Fosdick | 364/200 |
| 4,399,505 | 8/1983 | Druke | 364/200 |
| 4,901,235 | 2/1990 | Vora | 364/200 |
| 4,928,223 | 5/1990 | Dao | 364/200 |
| 4,975,837 | 12/1990 | Woodward | 364/200 |

Primary Examiner—Thomas C. Lee
Assistant Examiner—Eric Gleman
Attorney, Agent, or Firm—Foley & Lardner

[57] ABSTRACT

A data processing apparatus includes a control storage, a first storage, a second storage, an address storage, an identifying section, an executing section, a saving section, a holding section, a selecting section, and an exception handler. A first type instruction realized by a microprogram stored in the control storage and a second type instruction realized by an instruction program constituted by first type instructions are identified. When this identification result indicates a second type instruction, the data processing apparatus causes the second type instruction to be executed by first type instructions constituting instruction program for the second type instruction. When an exception occurs during the execution of this instruction program, the data processing apparatus can process the exception by using the address of the second type instruction saved in the saving section. The exception handler can handle an exception occurring during the execution of the instruction program for realizing a second type instruction.

1 Claim, 3 Drawing Sheets

DATA PROCESSING SYSTEM FOR EFFECTIVELY HANDLING EXCEPTIONS DURING EXECUTION OF TWO DIFFERENT TYPES OF INSTRUCTIONS

BACKGROUND OF THE INVENTION

The present invention relates to a data processing apparatus and, more particularly, to a data processing apparatus controlled by microprograms stored in a control storage.

In order to improve processing performance, a conventional data processing apparatus of this type employs a so-called horizontal type microinstruction system. In this system, a large bit configuration is employed to enhance a function of single step execution of microinstructions constituting a microprogram to realize parallel processing.

Especially for basic instructions which are used frequently, a hardware structure can be optimized to maximize the features of the above horizontal type microinstructions, and hence the number of steps for a microprogram is considerably decreased.

In contrast to this, in other instructions such as many kinds of control instructions, or list processing instructions where data or main storage are repeatedly processed, the operation is sequential. In these instructions even if advanced horizontal type microinstructions are used, the number of microinstructions to be executed in one step is small and there are a large number of unused microinstruction fields, i.e., the parallel processing performance is low. For this reason, such a data processing apparatus employs a hierarchical structure for executing various control instructions by using an instruction program constituted by the above-mentioned basic operation instructions, thereby increasing the utilization efficiency of a control storage for storing a microprogram in the word direction.

A conventional data processing apparatus has an arrangement shown in FIG. 1, i.e., comprises a main storage 1, an instruction fetch circuit 2, an instruction analyzing memory 3 (identifying means), a control storage circuit 4 (executing means), an arithmetic circuit 5, and an exception handler 8.

The main storage 1 comprises a software program section 11 (second storage means) for storing a software program for performing predetermined processing, and an instruction program section 12 (first storage means) for storing a plurality of instruction programs described by first type instructions.

The arithmetic circuit 5 is controlled by the control storage circuit 4 to perform various operations by using a microprogram for realizing a function defined by the first type instructions (to be described later).

The address of software program stored in the software program section 11 of the main storage 1 is generated by an instruction counter 25 and a serial address generating circuit 24 in an instruction fetch circuit 2, and is read out from the main storage 1 by an address held in an instruction address register 21. The readout software program is then stored in an instruction buffer register 22.

Note that instruction fetch is generally performed by a so-called prefetch method wherein when a given instruction is actually executed, the instruction has already reached the instruction buffer register.

First type instructions to be realized by a microprogram in a control storage 41 will be described below. In this case, first type instructions are basic instructions to which the effect of parallel processing of horizontal type microinstructions can be maximized. Generally, the frequency that such instructions are used in a software program is very high. Note that the first type instructions can be used in an instruction program or a software program.

An instruction code portion 221 of the instruction stored in the instruction buffer register 22 is supplied to the instruction analyzing memory 3. Control data 31 to 33 are then read out from the instruction analyzing memory 3 as initial values required to control a microprogram for the instruction. Data other than the instruction code portion 221 in the instruction buffer register 22 is supplied to the branch address generating circuit 23 as an operand.

The control data 32 is data representing whether the corresponding instruction is a first or second type instruction, and is supplied to a microinstruction sequencer 42 of the control storage circuit 4.

If the control data 32 represents that the instruction is a first type instruction, the microinstruction sequencer 42 supplies the control data 31 to the control storage 41 as the start address of a microprogram for executing this instruction, and reads out a microcode from the address of the control storage 41. The readout microcode is temporarily held in the microinstruction register 44 and is supplied therefrom to the arithmetic circuit 5.

Note that this microcode includes a method of determining next microinstruction address, or next microinstruction address itself. When the microinstruction sequencer 42 receives this address from the microinstruction register 44, the next microinstruction is read out. Thereafter, the data processing apparatus sequentially executes a target microprogram in the above-described manner.

Second type instructions to be realized by an instruction program constituted by the first type instructions will be described below. In this case, second type instructions are instructions where a small effect of parallel processing is expected using a microprogram consisting of horizontal type microinstructions, and where microinstructions are rather used like vertical type microinstructions. Note that the second type instructions can only be used in a software program, not in an instruction program.

If the control data 32 from the instruction analyzing memory 3 represents that the instruction is a second type instruction, the microinstruction sequencer 42 stops reading out a microinstruction from the control storage 41 to the microinstruction register 44. A microcode of NOP (no operation) is held in the microinstruction register 44, and the operation of the arithmetic circuit 5 is temporarily interrupted.

At the same time, the control data 32 is supplied to the branch address generating circuit 23. The circuit 23 then outputs the control data 33 as the start address of an instruction program for executing this instruction to the instruction address register 21 through the selector 27 so as to cause the register 21 to hold the start address of the instruction program. By using this address, the data processing apparatus starts reading out the instruction program from the instruction program section 12 of the main storage 1. As a result, the first instruction of the instruction program is stored in the instruction buffer register 22.

In addition, the control data 32 designates an instruction counter saving register 26 (saving means) to store the value (i.e., the address of the second type instruction) of an instruction counter 25 when second type instruction is at first read out from the main storage 1.

When a second type instruction B1 is to be executed by an instruction program described by first type instructions Aa to Ad as shown in FIG. 2, the first instruction Aa is stored in the instruction buffer register 22. Note that a software program in FIG. 2 is constituted by first type instructions A1 to A4 and the second type instruction B1.

Since the instruction Aa is of a first type, it is executed by the microprogram of the control storage 41. Similarly, the instructions Ab and Ac of the instruction program are executed by the microprogram of the control storage 41.

Although the instruction Ad is of a first type, it is the last instruction of the instruction program for executing the second type instruction B1 and serves to return the flow of processing to the instruction A3 next to the instruction B1 in the sequence of the original software program.

That is, the instruction Ad is defined as a relative branch instruction based on an address held in the instruction counter saving register 26. In this case, since the value of the instruction counter 25 when the second type instruction B1 is read out is held in the instruction counter saving register 26, if the instruction word length of the second type instruction B1 is set as a displacement of the relative branch instruction, the instruction address of the instruction A3 next to the second type instruction B1 is generated by the branch address generating circuit 23 in the instruction sequence. Thereafter, this instruction address is held in the instruction address register 21 through the selector 27.

At the same time, by using the address held in the instruction address register 21, the data processing apparatus starts reading out the instruction A3 from the software program section 11 of the main storage 1. The instruction A3 read out from the software program section 11 is stored in the instruction buffer register 22.

Since the instruction A3 is of a first type, it is executed by the microprogram stored in the control storage 41. Subsequently, instructions of the software program are sequentially executed.

The exception handler 8 is normally started when an exception is detected during execution of an instruction read out from the main storage 1 so as to generate an exception message and signal it to the software. In this case, an exception means an abnormal situation occurring during execution of a program, e.g., a software error. This exception message includes the address of an instruction upon occurrence of the exception as well as parameters determined by a type of exception. As the address of the instruction upon occurrence of the exception, the content of the instruction counter 25 at the time when the exception occurs is used. In the exception handler 8, the exception message is prepared by the contents of the instruction counter 25. The preparation of this exception message is generally called exception processing.

In the conventional data processing apparatus, however, if an exception occurs during the execution of the second type instruction B1 to be realized by the instruction program described by the first type instructions Aa to Ad, the addresses of the first type instructions Aa to Ad which are actually executed, i.e., the contents of the instruction counter 25 at the time when the first type instructions Aa to Ad are executed, are used as the address of an instruction upon occurrence of the exception, although the address of the second type instruction B1 should be used as the address of the instruction upon occurrence of the exception.

SUMMARY OF THE INVENTION

It is, therefore, a principal object of the present invention to provide a data processing apparatus capable of handling an exception occurring during the execution of an instruction program for realizing a second type instruction as an exception of the second type instruction.

In order to achieve the above object, according to an aspect of the present invention, there is provided a data processing apparatus comprising a control storage for storing a microprogram, first storage means for storing an instruction program constituted by a first type instruction realized by the microprogram, second storage means for storing a software program constituted by the first type instruction and a second type instruction realized by the instruction program stored in the first storage means, address storage means for storing addresses of instructions read out from the first and second storage means, identifying means for identifying an instruction read out from the second storage means as the first or second type instruction, executing means for executing the second type instruction by using the first type instruction constituting the instruction program read out from the first storage means when the identifying means identifies the readout instruction as the second type instruction, saying means for saving an address of the second type instruction when the identifying means identifies the readout instruction as the second type instruction, holding means for holding data representing that the second type instruction is being executed when the identifying means identifies the readout instruction as the second type instruction, selecting means for selecting one of addresses respectively stored in the address storage means and the saving means in accordance with the data held in the holding means, and exception handling means, connected to an output side of the selecting means, for preparing an exception message, wherein the exception handling means prepares the exception message on the basis of an address selected by the selecting means when an exception occurs during execution of one of the first and second type instruction which is read out from the second storage means.

DETAILED DESCRIPTION OF THE PREFERRED EMBODIMENT

Figure 1:
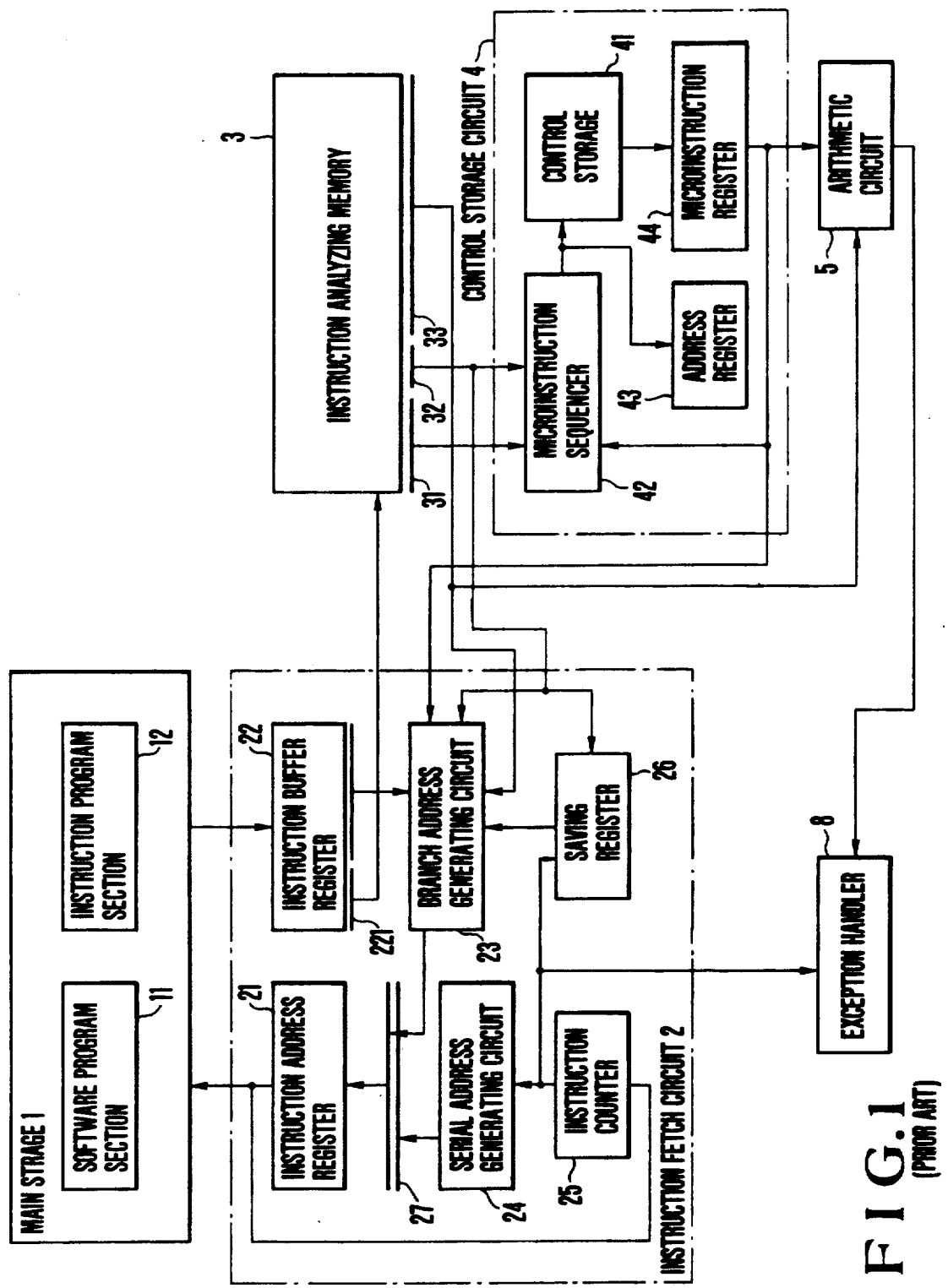
FIG. 1 is a block diagram showing a conventional data processing apparatus.
Figure 3:
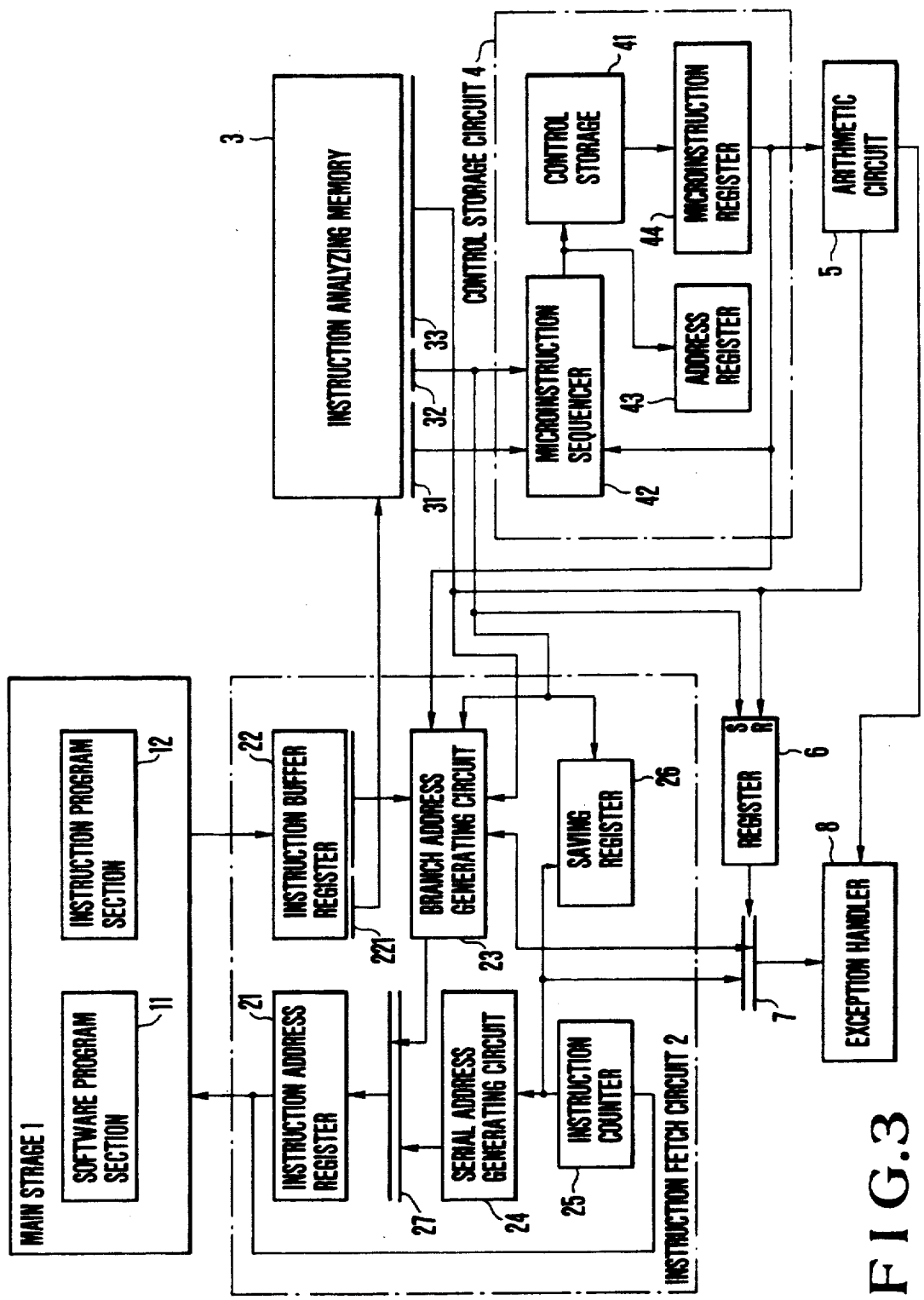
FIG. 3 is a block diagram showing a data processing apparatus according to a first embodiment of the present invention.

FIG. 3 shows a data processing apparatus according to a first embodiment of the present invention. The reference numerals in FIG. 3 denote the same parts as in FIG. 1. Referring to FIG. 3, reference numeral 6 denotes a register serving as a holding means; and 7, a selector serving as a selecting means.

Control data 32 and 33 from an instruction analyzing memory 3 are respectively input to set and reset terminals S and R of the register 6.

In accordance with output signal from the register 6, the selector 7 selects one of output signals from an instruction counter 25 and an instruction counter saving register 26 of an instruction fetch circuit 2, and outputs it to an exception handler 8. That is, the selector 7 selects one of the addresses of an instruction which is currently executed and of a second type instruction saved in the instruction counter saving register 26 in accordance with the content of the register 6.

Figure 2:
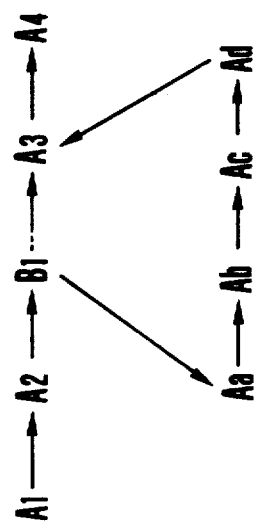
FIG. 2 is a view illustrating a sequence of a software program.

An operation of the embodiment of the present invention will be described below with reference to FIGS. 3 and 2. In the data processing apparatus, first type instructions A1 to A4 and a second type instruction B1 are read out from a software program section 11 of a main storage 1 by using an address held in an instruction address register 21 of the instruction fetch circuit 2 under the control of a control storage 41. The first type instructions A1 to A4 and the second type instruction B1 are sequentially executed in the same manner as the above-described operation of the data processing apparatus shown in FIG. 1.

At this time, in the data processing apparatus, in response to an instruction code portion 221 of an instruction stored in an instruction buffer register 22, control data 31 to 33 are read out from the instruction analyzing memory 3 as initial values required to control a microprogram for processing the instruction.

Of the control data 31 to 33, the data 32 represents whether the instruction is of a first or second type, as described above. When the instruction is of a first type, the data 32 is set at "0". When it is of a second type, the data 32 is set at "1".

As a result, the register 6 is set in accordance with the control data 32, and is set only when the data 32 represents a second type instruction.

Subsequently, when the first type instructions A1 to A4 are read out from the software program section 11 of the main storage 1 in the data processing apparatus, since the control data 32 from the instruction analyzing memory 3 represents a first type instruction, a microinstruction sequencer 42 supplies the control data 31 to a control storage 41 as the start address of a microprogram for realizing these instructions, and reads out a microcode from the corresponding address of the control storage 41. The readout microcode is temporarily held in a microinstruction register 44 and is supplied therefrom to an arithmetic circuit 5. As a result, the first type instructions A1 to A4 are executed by the microcode from the control storage. At this time, since "0" is input to the register 6, the register 6 is held in a reset state.

If an exception is detected during the execution of the first type instructions A1 to A4, for example, if an exception occurs during the execution of the first type instruction A2, since the register 6 holds "0", the selector 7 selects an output signal from the instruction counter 25, and outputs the address of the first type instruction A2 held in the instruction counter 25 to the exception handler 8. The exception handler 8 handles the address of the first type instruction A2 held in the instruction counter 25 as the address of an instruction upon occurrence of the exception and prepares an exception message.

When the second type instruction B1 is read out from the software program section 11 of the main memory 1 in the data processing apparatus, since the control data 32 from the instruction analyzing memory 3 represents a second type instruction, the microinstruction sequencer 42 stops reading out a microinstruction to the microinstruction register 44. As a result, a microcode of NOP (no operation) is held in the microinstruction register 44, and the operation of the operation circuit 5 is temporarily interrupted.

At the same time, the control data 32 is supplied to a branch address generating circuit 23. The circuit 23 outputs the control data 33 to the instruction address register 21 through a selector 27 as the start address of an instruction program for realizing processing of the instruction and causes the register 21 to hold it. The data processing apparatus starts reading out the instruction program from the instruction program section 12 by using this start address, and a first instruction Aa of the instruction program is stored in the instruction buffer register 22.

In addition, the control data 32 designates the instruction counter saving register 26 to store the value (i.e., the address of the second type instruction B1) of the instruction counter 25 when the initial second type instruction B1 is at first read out from the main storage 1. At this time, "1" is set in the register 6 by the control data 32.

Since instructions Aa to Ad constituting the instruction program for realizing the second type instruction B1 are first type instructions, they are realized by the microprogram in the control storage 41 and are sequentially executed thereby.

Although the instruction Ad is of a first type instruction, it is the last instruction of the instruction program for realizing the second type instruction B1, and is used to return the flow of processing to the instruction A3 next to the instruction B1 in the sequence of the original software program.

That is, the instruction Ad is defined as a relative branch instruction based on the address held in the instruction counter saving register 26. The value of the instruction counter 25 obtained when the second type instruction B1 is read out is held in the instruction counter saving register 26. Therefore, by setting the instruction word length of the second type instruction B1 as a displacement of the relative branch instruction, the instruction address of the instruction A3 next to the second type instruction B1 is generated in the instruction sequence in the branch address generating circuit 23. This instruction address is held in the instruction address register 21 through the selector 27.

At the same time, the data processing apparatus starts reading out the instruction A3 from the software program section 11 of the main storage 1 by using the address held in the instruction address register 21. The instruction A3 read out from the software program section 11 is stored in the instruction buffer register 22.

Since the instruction A3 is of a first type, it is realized by the microprogram stored in the control storage 41. Subsequently, the instructions of the software program are sequentially realized.

If no exception is detected when the instruction program described by the instructions Aa to Ad, i.e., the second type instruction B1 is executed without exception processing apparatus, the register 6 is reset at the execution of instruction Ad by the control data 33 read out from the instruction analyzing memory 3. That is, the register 6 is set when the execution of the second type instruction B1 is started, and is reset when the execution is completed.

If an exception detected during the execution of the instruction program for realizing the second type instruction B1, e.g., if an exception occurs during the execution of the first type instruction Ab in the instruction program, since "1" is held in the register 6, the selector 7 selects an output signal from the instruction counter saving register 26 and outputs the address of the second type instruction B1 saved in the register 26 to the exception handler 8. The exception handler 8 handles the address of the second type instruction B1 saved in the register 26 as the address of an instruction upon occurrence of an exception and prepares an exception message.

When an exception occurs during the execution of the instruction program, the address of the second type instruction B1 saved in the instruction counter saving register 26 is selected by the selector 7 in accordance with data representing that the instruction program held in the register 6 is being executed, and is supplied to the exception handler 8. For this reason, the data processing apparatus can handle an exception occurring during the execution of the instruction program for realizing the second type instruction not as an exception of the first type instructions Aa to Ad constituting the instruction program but as an exception of a second type instruction, therefore performing correct exception handling.

Furthermore, in a data processing apparatus having hardware capable of performing parallel processing of software instructions by pipeline processing, the execution time can be shortened.

As has been described above, according to the present invention, a first type instruction realized by a microprogram stored in a control storage and a second type instruction realized by an instruction program constituted by first type instructions are identified. When this identification result indicates a second type instruction, the data processing apparatus causes the second type instruction to be executed by instruction program constituted by first type instructions. In addition, when an exception occurs during the execution of this instruction program, the data processing apparatus can process the exception by using the address of the second type instruction saved in the saving means. The data processing apparatus can handle an exception occurring during the execution of the instruction program for realizing a second type instruction, and hence can perform correct exception processing.

In the embodiment of the present invention, the start address of an instruction for realizing the second type instruction B1 is stored in the instruction analyzing memory 3. However, only part of the start address of the instruction program for realizing the second type instruction B1 may be stored in the instruction analyzing memory 3, and a start address may be generated by combining the part of the start address with a predetermined constant.

Furthermore, in the embodiment of the present invention, the start address of the microprogram for realizing the processing of the first type instructions A1 to A4 is defined by the control data 31 of the instruction analyzing memory 3, and the start address of the instruction program for realizing the processing of the second type instruction B1 is defined by the control data 33 of the memory 3. However, the start address of the instruction program for realizing the second type instruction B1 may be assigned to the control data 31 of the instruction analyzing memory 3 which designates the start address of the microprogram for realizing the processing of the first type instructions A1 to A4 and Aa to Ad.

Moreover, in the embodiment of the present invention, the register 6 is reset by using the control data 33 from the instruction analyzing memory 3. However, the register 6 may be reset by, e.g., a microinstruction. The present invention is not limited to these.

What is claimed is:

1. A data processing apparatus comprising:
   a control storage for storing a microprogram;
   first storage means for storing an instruction program which includes a first type instruction realized by said microprogram;
   second storage means for storing a software program which includes a first type instruction and a second type instruction realized by said instruction program stored in said first storage means;
   address storage means for storing addresses of instructions read out from said first and second storage means;
   identifying means for identifying an instruction read out from said second storage means as a first or a second type instruction;
   executing means for executing a second type instruction using a first type instruction of said instruction program read out from said first storage means when said identifying means identifies a readout instruction as a second type instruction;
   saving means for saving an address of a second type instruction when said identifying means identifies said readout instruction as a second type instruction;
   holding means for holding data representing that said second type instruction is being executed when said identifying means identifies said readout instruction as a second type instruction;
   selecting means for selecting one of addresses respectively stored in said address storage means and said saving means in accordance with data held in said holding means; and
   exception handling means, connected to an output side of said selecting means, for generating an exception message, wherein said exception handling means generates said exception message on the basis of an address selected by said selecting means when an exception occurs during execution of one of said first and second type instructions which is read out from said second storage means.

* * * * *